(12) United States Patent  
Ross

(10) Patent No.: US 6,195,447 B1
(45) Date of Patent: Feb. 27, 2001

(54) SYSTEM AND METHOD FOR FINGERPRINT DATA VERIFICATION

(75) Inventor: Paul C. Ross, Morris Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/008,623

(22) Filed: Jan. 16, 1998

(51) Int. Cl.$^7$ .................................................. G06K 9/00
(52) U.S. Cl. ........................................... 382/125; 382/124
(58) Field of Search ................................. 382/124, 125, 382/126, 127; 380/23

(56) References Cited

U.S. PATENT DOCUMENTS

| | | |
|---|---|---|
| 4,353,056 | 10/1982 | Tsikos . |
| 4,438,824 | 3/1984 | Mueller-Schloer . |
| 4,455,083 | 6/1984 | Elmes . |
| 4,731,841 | 3/1988 | Rosen et al. . |
| 4,736,423 | 4/1988 | Matyas . |
| 4,747,147 | 5/1988 | Sparrow . |
| 4,868,877 | 9/1989 | Fischer . |
| 4,879,747 | 11/1989 | Leighton et al. . |
| 4,882,779 | 11/1989 | Rahtgen . |
| 4,947,442 | 8/1990 | Tanaka et al. . |
| 4,993,068 | 2/1991 | Piosenka et al. . |
| 4,995,081 | 2/1991 | Leighton et al. . |
| 5,005,200 | 4/1991 | Fischer . |
| 5,020,105 | 5/1991 | Rosen et al. . |
| 5,222,153 * | 6/1993 | Beiswenger ........................ 382/127 |
| 5,272,754 | 12/1993 | Boerbert . |
| 5,325,442 | 6/1994 | Knapp . |
| 5,613,014 * | 3/1997 | Eshera et al. ..................... 382/124 |
| 5,659,626 * | 8/1997 | Ort et al. ........................... 382/125 |

* cited by examiner

Primary Examiner—Bhavesh Mehta

(57) ABSTRACT

A system and method for authenticating fingerprints includes a remote site having a scanner for generating fingerprint data and an access mechanism. A local site connects to the remote site via transmission cables and includes a processor for extracting minutia from the fingerprint data. A comparator matches the fingerprint data to historical fingerprint data maintained in a database to verify whether the detected fingerprint data falls within statistical maximum deviations and exceeds statistical minimum deviations to establish the authenticity of the fingerprint.

24 Claims, 4 Drawing Sheets

SYSTEM AND METHOD FOR FINGERPRINT DATA VERIFICATION

FIELD OF THE INVENTION

The invention relates to fingerprint verification systems and methods and, more particularly, a system and method for discriminating between a real fingerprint and a counterfeit fingerprint.

BACKGROUND OF THE INVENTION

Human fingerprints provide a unique and relatively economical means for identifying particular individuals. Every fingerprint typically comprises a series of spaced apart curved ridges resembling a topographical map. The ridges often form irregularities that terminate in endings and/or may split to bifurcate and form other adjacent ridges. Because of the randomness and sheer numbers of such features, data representative of the features offers a conveniently compressed form of identifier that retains the uniqueness of a full fingerprint.

Taking advantage of the uniqueness of a fingerprint's topographical characteristics, those skilled in the art have devised fingerprint identification systems to compare an unknown fingerprint to a database of known fingerprints. One such proposal, disclosed in U.S. Pat. No. 4,747,147 to Sparrow, includes a computerized fingerprint comparison system for law enforcement purposes. The system scans an unknown fingerprint and breaks down the fingerprint into predetermined minutia points comprising particular topographical characteristics. Such minutia include particular types of irregularities, the scanning angle, the ridge count, and the radial distance between minutia.

A second proposal that carries an improved version of the Sparrow teachings into the field of security systems and methods is disclosed in U.S. Pat. No. 4,947,442 to Tanaka. Tanaka implements a system having respective remote and local sites separated by transmission lines. The system extracts fingerprint data to establish predetermined minutia points from fingerprint ridge endings and bifurcations. The improvement by Tanaka includes the capability of not only detecting predetermined characteristic minutia, but also non-characteristic minutia. This allegedly improves the resolution of detected real time fingerprints to provide a closer match between compared fingerprint files.

While the Tanaka proposal appears beneficial for its intended purposes, it suffers from a basic problem in that it cannot distinguish between a real fingerprint presented for verification, and a perfectly matching counterfeit fingerprint file injected through the transmission lines to the local site. This is because from the system's point of view, perfectly matching minutia satisfy the system's security criteria. Although such active tampering in security systems may be countered by encryption methods disposed at the remote and local sites, many operators choose not to implement such methods due to the typically prohibitive costs arising from the additional hardware and software required to effect the relatively complex encryption schemes. Moreover, other potential solutions to detect the presence of a real digit, for example blood flow or body temperature sensors, also undesirably increase hardware and software costs.

Therefore, the need exists for an economical and feasible system and method for discriminating between real fingerprints and counterfeit fingerprint data. The system and method of the present invention satisfies this need.

SUMMARY OF THE INVENTION

The system and method of the present invention provide the advantage of increasing security in security systems that utilize fingerprint comparisons, without requiring additional hardware costs.

To realize the advantages above, the present invention, in one form, comprises a fingerprint authentication system for use in a secured environment for verifying a fingerprint having a nonpredictable plasticity. The system includes a remote site located proximate the secured environment. The remote site includes a fingerprint detector for generating real time image data of an applied fingerprint and an access mechanism responsive to a verification signal to provide access to the secured environment. The system also includes a local site disposed distally from the secured environment and coupled in signal communication to the remote site. The local site includes a processor for extracting from the image data real time topographical minutia points and measuring at least one real time physical relationship between the real time minutia points.

A database memory interacts with the processor for storing a historical image file corresponding to the applied fingerprint. The historical image file comprises respective statistical representations of respective spatial relationships between the minutia points. The statistical representations are acquired through repeated detection and statistical analysis of the applied fingerprint. The local site further includes a comparator for identifying the real time physical relationship against the corresponding statistical spatial relationship and verifying the applied fingerprint as authentic where the real time physical relationship is not less than a predetermined minimum deviation from the statistical spatial relationship corresponding to the fingerprint plasticity and not greater than a predetermined maximum deviation from the statistical spatial relationship corresponding to a different fingerprint.

BRIEF DESCRIPTION OF THE DRAWINGS

Other features and advantages of the present invention will be apparent from the following detailed description when read in conjunction with the accompanying drawings, wherein.

DETAILED DESCRIPTION OF THE INVENTION

The present invention provides the capability of discriminating between real fingerprint data and counterfeit fingerprint data by recognizing a degree of inexactness between respective scans of the same fingerprint. As a direct result, detection of real time fingerprint data corresponding exactly to previously acquired fingerprint data causes a rejection of the fingerprint as a counterfeit.

Figure 1:
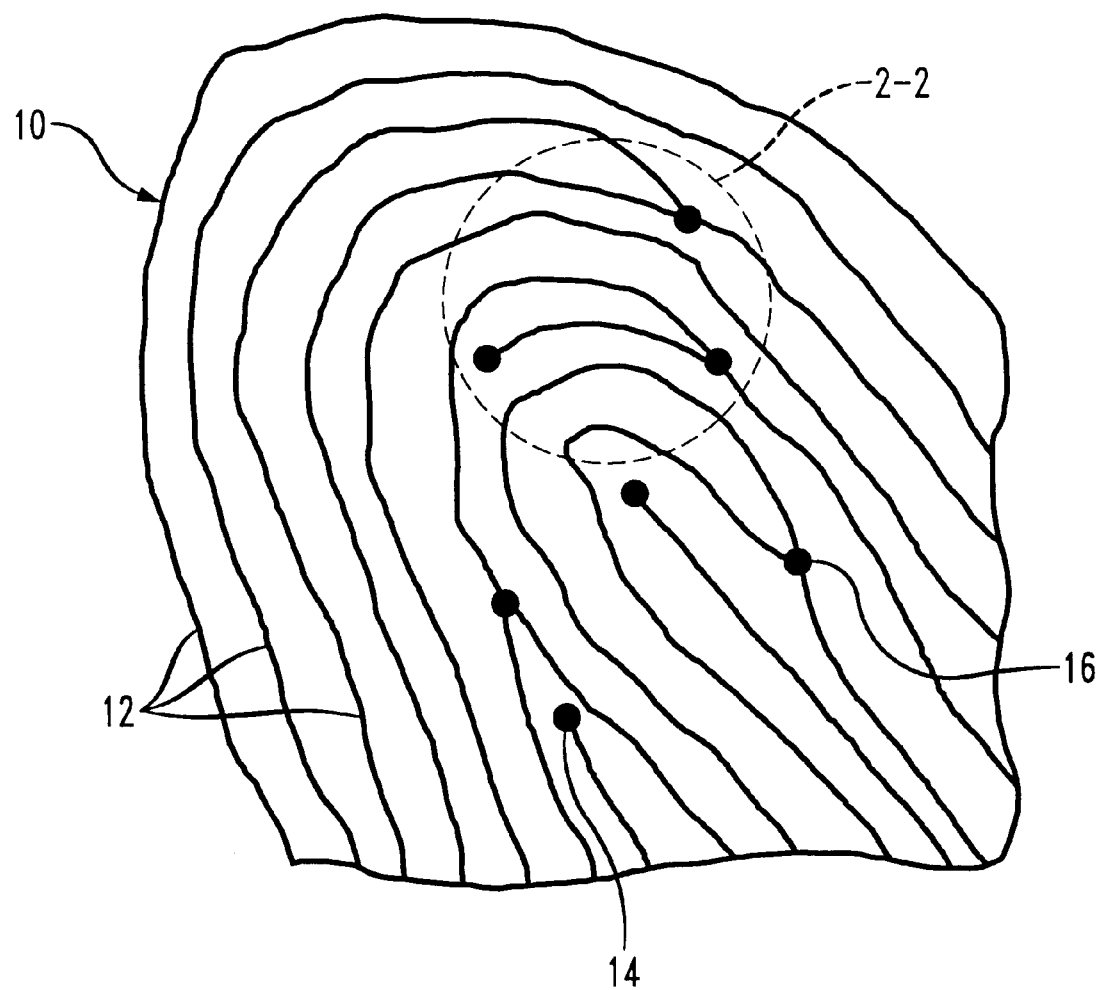
FIG. 1 is a partial top plan view of a human fingerprint with a plurality of highlighted minutia points.

Referring now to FIG. 1, a portion of a human fingerprint 10 is shown with a sizeable number of peripheral ridges 12. A number of the ridges, clustered near the center of the fingerprint, exhibit irregularities in the form of ridge terminations 14 and ridge bifurcations 16. Such irregularities are repeatedly detectable by fingerprint scanning machines and serve as excellent markers, or minutia, for fingerprint comparison.

Figure 2:
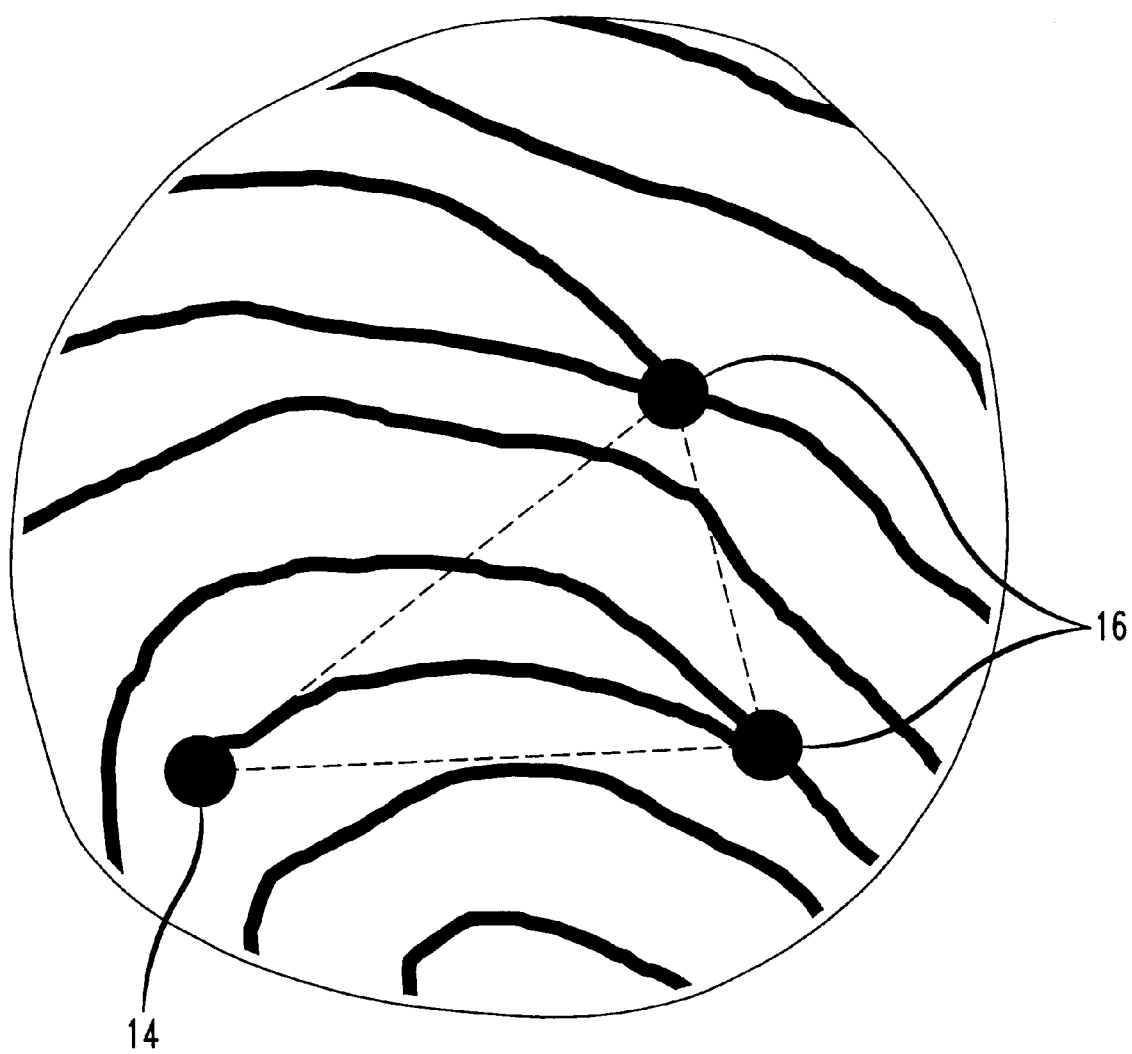
FIG. 2 is an enlarged view of detail 2—2 of FIG. 1.

FIG. 2 illustrates an enlarged view of three minutia points exhibiting a termination 14 and two bifurcations 16 to clearly show the relative physical relationships associated between each feature. Relative relationships include any relative spatial measurements, for example, radial spacing, linear spacing, angular displacement, and the number of ridges between points. By taking data of such minutia relationships, the fingerprint may be represented in the digital domain with a level of uniqueness comparable to that in the real world domain.

I have discovered that a plurality of variables control the relative precision between the relative minutia relationships with successive detections of the same fingerprint. Such variables include the inherent plasticity of the finger, pressure applied by the finger on a scanning window to scan the fingerprint, the orientation of the finger on the window, and the calibration and precision of the scanner itself. As a result, no two "real" fingerprints represented by minutia data are identical, unless counterfeited.

Figure 3:
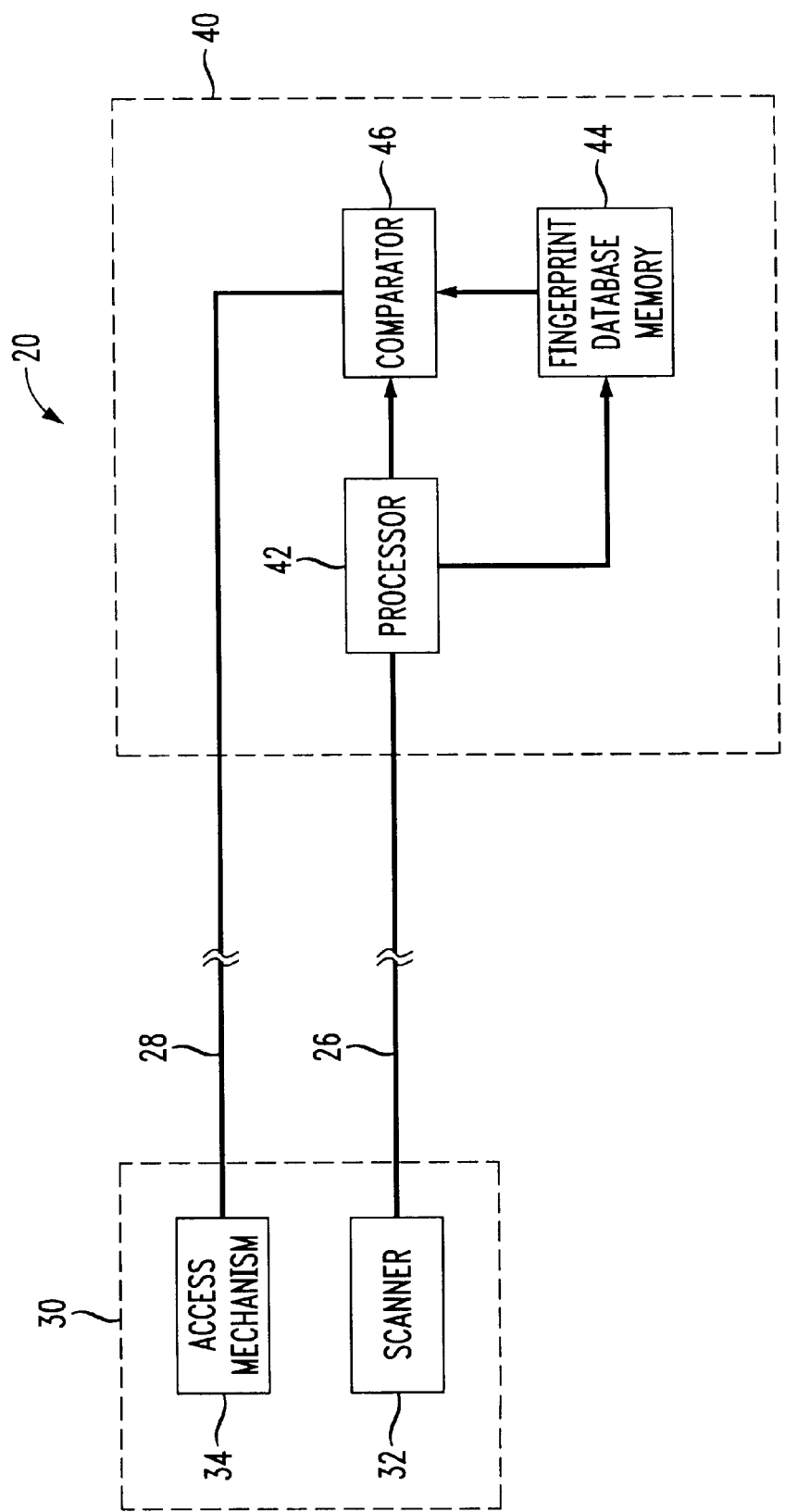
FIG. 3 is a block diagram of the system of the present invention according to one illustrative embodiment.

Referring now to FIG. 3, a fingerprint authentication system according to one embodiment of the present invention, generally designated 20, takes advantage of the discovery above and includes a remote site 30 for selectively allowing access to a secured environment (not shown) and coupled to a distally disposed local site 40 through transmission cables 26 and 28. It is to be understood that the secured environment may comprise a restricted entryway to a room or physical location, or a restricted electronically coupled data path or database.

With further reference to FIG. 3, the remote site 30 includes a fingerprint detector or scanner 32 for generating real time image data of an applied fingerprint. The scanner, according to one form of the invention, comprises a capacitive fingerprint scanner such as that disclosed in U.S. Pat. No. , assigned to the assignee of the present invention, and the disclosure of which is incorporated herein by reference. Alternatively, the scanner may comprise any optical scanning device as is well known in the art.

In order to allow the particular individual access to the secured area, the remote site 30 includes an access mechanism 34 operative in response to a verification signal from the local site 40. The access mechanism may take many forms that are well within the level of skill in the art.

Referring further to FIG. 3, the local site 40 couples to the remote site scanner 32 and access mechanism 34 through the respective transmission cables 26 and 28 that provide signal communication between the two sites. While separation of the two sites across transmission lines invites active security breaches in conventional systems, the benefits of having a remote/local layout are well protected through implementation of the present invention.

At the local site 40, a processor 42 receives the scanned fingerprint image data from the scanner 32 across the transmission line 26 and acts to locate the real time discrete topographical minutia points. Processing in this fashion involves extracting minutia points representing individual endings of fingerprint ridges and bifurcations between ridges, then identifying at least one real time physical relationship between the real time minutia points. The processor then converts the data representing such physical relationships into a real time feature vector that may be used for comparison to other fingerprint feature vectors as is well known in the art.

The processor 42 also connects to a fingerprint database memory 44 to assist in maintaining accurate criteria for subsequent comparison of the real time feature vector to previously detected feature vectors. The processor statistically analyzes the real time feature vector as an individual sample with respect to a history file for the particular fingerprint. The history file is accessed from the fingerprint database memory and includes statistical criteria comprising mean values of physical relationships between predetermined minutia, or calculated standard deviations between minutia. The file is statistically updated each time the corresponding fingerprint is successfully utilized to gain access to the secured area and is transmitted back to the database memory for storage. A predetermined number of previously detected feature vectors for the particular fingerprint are maintained to carry out the anti-counterfeiting feature of the present invention as will be more fully explained below in the description of the method of the present invention.

Disposed at a second output of the processor 42 is a comparator 46 for receiving the processed real time feature vector and matching it up against fingerprint feature vectors stored in the fingerprint database memory 44 and satisfying certain criteria described below in the method of the present invention. The comparator generates a verification signal for transmission across the transmission line 28 to the access mechanism 34 to admit or deny entry to the secured area.

Figure 4:
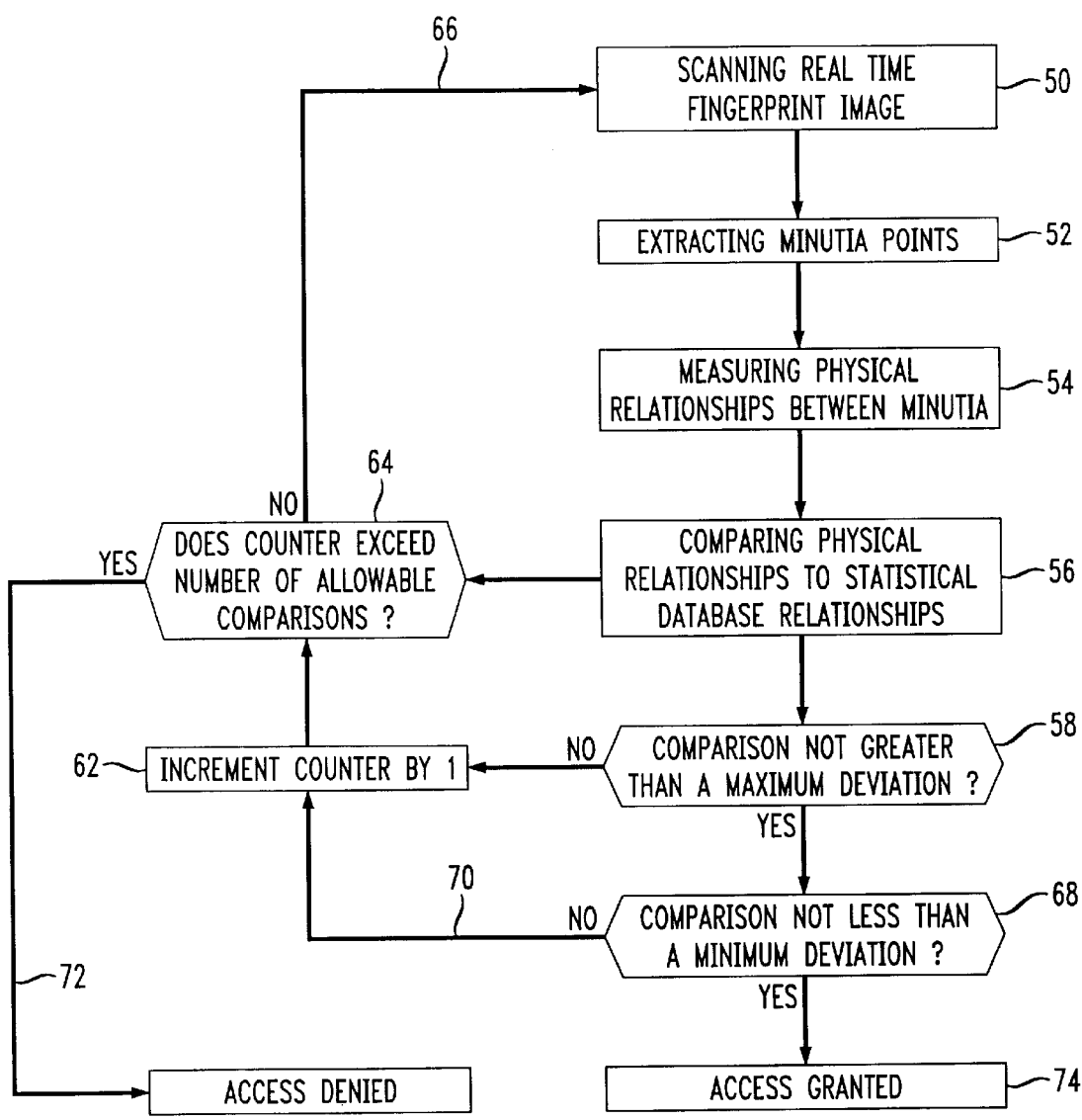
FIG. 4 is a flow chart of the method of the present invention according to one illustrative embodiment.

Operation of the system of the present invention 20 proceeds according to the method of the present invention. Referring now to FIG. 4, an individual desiring access to a secured area places his finger onto the scanner 32 for scanning a real time image of his fingerprint, at step 50.

The scanned fingerprint image data generated by the scanner 32 comprises digital data for transmission across the signal line 26 that separates the remote site 30 from the local site The processor 42 captures and analyzes the data. Based on this analysis, it extracts real time discrete topographical minutia points, at step 52. The processor then identifies and measures at least one real time physical relationship between the real time minutia points, at step 54. Typically, this involves extracting minutia representing individual endings of fingerprint ridges or bifurcations of fingerprint ridges and assigning values to respective relationships between minutia. Such relationships include, for example, relative distances between minutia and/or relative angular orientations between minutia. The values are used to define a unique and convenient real time feature vector for the fingerprint.

Once the real time feature vector is extracted from the fingerprint image data, it is compared to a database of previously detected feature vectors, at step 56, according to statistical criteria calculated from successive detections of the same fingerprint. Because of the plurality of non-predictable variables that cause inexactness between successive fingerprint scans, a real time fingerprint feature vector must have a certain degree of allowable inexactness or tolerance to be able to successfully match to a known fingerprint template.

The statistical criteria used may be generated any number of ways as is well known in the art. I have found it particularly beneficial to use measures of distance between predetermined minutia points developed over a series of presentations of the same finger. For example, using the distance x between a given minutia point and the nearest minutia points within some fixed distance such as a quadrant, the mean distance X and the standard deviation of the distance measures may be calculated. An expression for determining the mean distance includes:

Mean X=Σn/x where n is the number of minutia points considered.
Similarly, the standard deviation may be determined according to the expression:

$$\sqrt{\Sigma x^2 - \frac{\Sigma x^{2/n}}{n-1}}$$

With the statistical criteria established, and following the step of comparing, at step 56, the comparator 46 takes the real time physical feature vector and determines whether the feature vector has physical relationship data no greater than the established statistical criteria, as shown in step 58, to establish an initial match and warrant further comparison. If no initial match is established, a signal is sent to an incremental counter, at step 62, to track the number of unsuccessful matches. If the number of unsuccessful matches exceeds a predetermined level, at step 64, such as three, an access denied signal is sent to the remote site access mechanism 34. If the number of unsuccessful matches falls under the predetermined level, the individual is directed to reapply the fingerprint for another scan, at step 66, and carry through another iteration of the above described steps.

Should the comparator 46 find an initial match, a further set of statistical criteria must be satisfied to verify that the fingerprint image is real and not a counterfeit. Again taking into account the phenomena that successive detected fingerprint image minutia from the same finger will be inexact, the next set of criteria establishes a minimal level of comparative deviation that must be satisfied before access will be granted. The minimal level of deviation may be established similar to the maximum statistical boundaries, but focusses on the effects of plasticity of the finger, pressure applied to the scanner, and the scanner calibration and precision.

The real time feature vector is then compared to the database feature vector to verify the presence of inexact physical minutia relationships, at step 68, according to the minimum deviation criteria. If the two feature vectors match exactly, or with a deviation less than the statistical minimum criteria, the real time feature vector is considered a digital copy or counterfeit, and a signal is sent to the counter, at step 70, to record the number of attempts made. If the number of resubmissions is less than the predetermined allowable number, at step 66, a reverification signal is transmitted to the access mechanism 34 to request the individual to reapply the fingerprint. If the number of resubmissions is above the allowable number, access is denied at step 72.

If the real time feature vector comparison satisfies the minimum deviation statistical criteria, an access signal is transmitted across the transmission line 28 to grant access to the individual, at step 74.

A convenient feature of the present invention is the constant updating of the statistical criteria following successful admittance of the individual. The updating includes storing the verified real time feature vector in the database, and including the real time minutia relationships in the previously applied statistics to modify the criteria so that the criteria takes into account all or only the most recent minutia relationships.

Those skilled in the art will appreciate the many benefits and advantages afforded by the present invention. Of particular importance is the feature of taking into account the inexactness between subsequently detected fingerprint images to provide an economical and highly reliable way of detecting digital fingerprint forgeries. This feature raises the level of reliability for the security system to ensure against active breaches in the transmission lines connecting the remote and local sites.

Moreover, the improved reliability of the invention is obtainable without any additional specialized hardware, offering an inexpensive alternative to relatively costly devices such as blood flow detectors and body temperature sensors to detect real fingerprints. As a result, procurement and operating costs are substantially minimized.

While the invention has been particularly shown and described with reference to the preferred embodiments thereof, it will be understood by those skilled in the art that various changes in form and detail may be made therein without departing from the spirit and scope of the invention. In particular, while the remote site 30 and local site 40 are illustrated at separate locations connected by communication lines 26 and 28, in practice the remote and local sites may be very close to each other. For example, they may be units within a common piece of equipment at the same site and disposed within only inches or feet apart. In such circumstances, my present invention protects against trespass with the equipment to inject a counterfeit signal in the small fraction of cable which connects units 30 and 40.

Moreover, while the foregoing description depicts applications for the present invention in the context of fingerprints, the invention is applicable to any object having a plasticity or deformable characteristic such as a hand to provide a handprint.

What is claimed is:

1. An object authentication system for use in a secured environment for verifying an object having a nonpredictable plasticity in order to detect a counterfeit fingerprint, said system including:
    a remote site for selectively allowing access to said secured environment and including:
        a detector for generating real time image data of an applied object;
        an access mechanism responsive to a verification signal to provide access to said secured environment; and
    a local site disposed from said secured environment and coupled in signal communication to said remote site, said local site including
        a processor for extracting from said image data real time topographical minutia points and measuring at least one real time physical relationship between said real time minutia points;
        a database memory for storing a historical image file corresponding to said applied object, said historical image file comprising respective statistical representations of respective spatial relationships between said minutia points, said statistical representations acquired through repeated detection and statistical analysis of said applied object; and
        a comparator for comparing said real time physical relationship to said statistical representations of said object and operative
            to verify said applied object as matching said statistical representations where said real time physical relationship is within a predetermined minimum deviation from said statistical representations and
            to further verify said applied object in order to determine whether said applied object is a counterfeit, said applied object being authentic where said real time physical relationship is greater than zero and not greater than a predetermined maximum deviation from said statistical representations.

2. An object authentication system according to claim 1 wherein:
said object comprises a fingerprint.

3. An object authentication system according to claim 1 wherein:
said object comprises a handprint.

4. An object authentication system according to claim 1 wherein:
said detector comprises an optical scanning device.

5. An object authentication system according to claim 2 wherein:
said detector comprises a capacitive fingerprint scanning device.

6. A fingerprint authentication system according to claim 2 wherein:
said minutia points comprise spatial relationships between at least one characteristic from the following group comprising ridge endings, ridge bifurcations and ridge count.

7. A fingerprint authentication system according to claim 1 wherein:
said secured environment comprises physical location.

8. A fingerprint system for verifying a fingerprint having a nonpredictable plasticity in order to detect a counterfeit fingerprint, said system including:
a fingerprint scanner, said scanner generating real time image data signals of an applied fingerprint;
a programmed processor, said processor operating to extract real time topographical minutia points from said image data signals and to measure at least one real time physical relationship between said real time minutia points to form physical relationship signals;
a database memory in which is stored a historical image data signal file corresponding to said applied fingerprint, said historical image data signal file comprising respective statistical spatial relationship signals representative of respective spatial relationships between said minutia points, said statistical representations acquired through repeated detection and statistical analysis of said applied fingerprint; and
a comparator which receives said real time physical relationship signals and said corresponding statistical signals and compares them to verify said applied fingerprint as matching said statistical representations where said real time physical relationship is within a predetermined minimum deviation from said statistical representations in order to determine whether said applied fingerprint is a counterfeit and as authentic where said real time physical relationship signal is greater than zero and not greater than a predetermined maximum deviation from said statistical representations.

9. A fingerprint authentication system according to claim 8 wherein:
said fingerprint scanner comprises an optical scanning device.

10. A fingerprint authentication system according to claim 8 wherein:
said fingerprint scanner comprises a capacitive fingerprint scanning device.

11. A fingerprint authentication system according to claim 8 wherein:
said minutia points comprise spatial relationships between at least one characteristic from the group consisting of ridge endings, ridge bifurcations and ridge count.

12. A fingerprint authentication system according to claim 8 and further including:
a remote site for selectively allowing access to said secured environment;
an access mechanism responsive to a verification signal to provide access to said secured environment;
a local site disposed from said secured environment and coupled in signal communication to said remote site; and
said secured environment comprises a restricted physical location.

13. A fingerprint authentication system according to claim 12 wherein:
said secured environment comprised a restricted electronic data path.

14. A method of determining whether a fingerprint having a nonpredictable plasticity is counterfeit, said fingerprint having a corresponding digitized image file stored in a remote database memory and comprising respective statistical representations of respective spatial relationships between discrete topographical minutia points, said minutia points acquired through repeated detection of said fingerprint, said method including the steps of:
detecting real time image of said fingerprint;
processing said image data to locate real time discrete topographical minutia points and identify at least one real time physical relationship between said real time minutia points corresponding to said statistical representations;
comparing said real time physical relationship to said statistical representations;
verifying said fingerprint matching said statistical representations where said real time physical relationship is within a predetermined minimum deviation from said statistical representations; and
determining whether said fingerprint is a counterfeit based on said fingerprint being authentic where said real time physical relationship is greater than zero and not greater than a predetermined maximum deviation from said statistical representations.

15. A method according to claim 14 wherein:
said detecting step includes scanning real time image data with an optical scanner.

16. A method according to claim 14 wherein:
said processing step includes extracting minutia representing individual endings of fingerprint ridges.

17. A method according to claim 14 wherein:
said processing step includes extracting minutia representing bifurcations of fingerprint ridges.

18. A method according to claim 14 wherein:
said processing step includes determining relative spatial coordinates between minutia points.

19. A method according to claim 14 wherein:
said processing step includes determining relative angular coordinates between minutia points.

20. A method according to claim 14 wherein:
said comparing step includes identifying statistical mean coordinates for comparison between said real time minutia and said historical minutia.

21. A method according to claim 14 wherein:
said comparing step includes identifying statistical standard deviation information for comparison between said real time minutia and said historical minutia.

22. A method of determining whether a fingerprint applied on a fingerprint authentication system is a counterfeit, said fingerprint having a nonpredictable plasticity, said method including the steps of:

storing a corresponding digitized image file corresponding to said applied fingerprints in said system, said image file comprising respective statistical representations of respective spatial relationships between discrete topographical minutia points, said minutia points acquired through repeated detection of said fingerprints, said method including the steps of:

detecting real time image data of said fingerprint with a fingerprint scanner;

processing said image data to locate real time discrete topographical minutia points and identify at least one real time physical relationship between said real time minutia points corresponding to said statistical representations;

comparing said real time physical relationship to said statistical representations;

verifying said fingerprint matching said statistical representations where said real time physical relationship is within a predetermined minimum deviation from said statistical representations; and determining whether said fingerprint is a counterfeit based on said fingerprint being authentic where said real time physical relationship is greater than zero and not greater than a predetermined maximum deviation from said statistical representations.

23. A method according to claim 22 and further including the step of:

updating said digitized image file with said real time physical relationship if said verifying step determines that said fingerprint is authentic.

24. A method of determining whether a fingerprint having a nonpredictable plasticity is a counterfeit, said fingerprint having a corresponding digitized image file stored in a remote database memory and comprising respective statistical representations of respective spatial relationships between discrete topographical minutia points, said minutia points acquired through repeated detection of said fingerprint, said method including the steps of:

detecting real time image data of said fingerprint;

processing said image data to locate real time discrete topographical minutia points and identify at least one real time physical relationship between said real time minutia points; and determining whether said fingerprint is a counterfeit based on said fingerprint being authentic where said real time physical relationship is greater than zero and not greater than a predetermined maximum deviation from said statistical representations.

\* \* \* \* \*